US011587326B2

(12) United States Patent
Carey (10) Patent No.: US 11,587,326 B2
(45) Date of Patent: Feb. 21, 2023

(54) VIDEO IDENTIFICATION AND ANALYTICAL RECOGNITION SYSTEM

(71) Applicant: James Carey, Commack, NY (US)

(72) Inventor: James Carey, Commack, NY (US)

( * ) Notice: Subject to any disclaimer, the term of this patent is extended or adjusted under 35 U.S.C. 154(b) by 30 days.

(21) Appl. No.: 17/410,167

(22) Filed: Aug. 24, 2021

(65) Prior Publication Data

US 2021/0383132 A1 Dec. 9, 2021

Related U.S. Application Data

(63) Continuation of application No. 14/256,385, filed on Apr. 18, 2014, now Pat. No. 11,100,334.

(60) Provisional application No. 61/813,942, filed on Apr. 19, 2013.

(51) Int. Cl.
*G06V 20/52* (2022.01)
*G06T 7/20* (2017.01)
*G08B 13/196* (2006.01)

(52) U.S. Cl.
CPC ............... *G06V 20/53* (2022.01); *G06T 7/20* (2013.01); *G06V 20/52* (2022.01); *G08B 13/19608* (2013.01); *G08B 13/19613* (2013.01); *G06T 2207/10016* (2013.01); *G06T 2207/30232* (2013.01)

(58) Field of Classification Search
CPC ........ G06V 20/53; G06V 20/52; G06V 10/20; G06T 7/20; G06T 2207/10016; G06T 2207/30232; G08B 13/19608; G08B 13/19613; G06F 16/71; G06F 16/783; G06K 9/62
See application file for complete search history.

(56) References Cited

U.S. PATENT DOCUMENTS

| 6,975,346 B2 | 12/2005 | Kumhyr |
| 7,308,487 B1 | 12/2007 | Dansie et al. |
| 8,195,598 B2 | 6/2012 | Hua et al. |
| 8,615,254 B2 | 12/2013 | Jamtgaard et al. |
| 9,773,163 B2 | 9/2017 | Carey |

(Continued)

FOREIGN PATENT DOCUMENTS

| JP | 2004005511 A | 1/2004 |
| JP | 2008204079 A | 9/2008 |

(Continued)

OTHER PUBLICATIONS

European Examination Report dated Mar. 11, 2022 issued in corresponding EP Appln. No. 20 153 816.2.

(Continued)

*Primary Examiner* — Richard T Torrente
(74) *Attorney, Agent, or Firm* — Carter, DeLuca & Farrell LLP (57) ABSTRACT

An analytical recognition system includes one or more video cameras configured to capture video and a video analytics module configured to perform real-time video processing and analyzation of the captured video and generate non-video data. The video analytic module includes one or more algorithms configured to identify an abnormal situation. Each abnormal situation alerts the video analytics module to automatically issue an alert and track one or more objects or individuals by utilizing the one or more video cameras. The abnormal situation is selected from the group consisting of action of a particular individual, non-action of a particular individual, a temporal event, and an externally generated event.

18 Claims, 7 Drawing Sheets

(56) References Cited

U.S. PATENT DOCUMENTS

| | | |
|---|---|---|
| 10,078,787 B2 | 9/2018 | Carey |
| 2003/0197612 A1 | 10/2003 | Tanaka et al. |
| 2004/0161133 A1 | 8/2004 | Elazar et al. |
| 2007/0003141 A1 | 1/2007 | Rittscher et al. |
| 2007/0057049 A9 | 3/2007 | Kundu et al. |
| 2007/0127774 A1 | 6/2007 | Zhang et al. |
| 2007/0297607 A1 | 12/2007 | Ogura et al. |
| 2008/0018738 A1 | 1/2008 | Lipton et al. |
| 2008/0106599 A1 | 5/2008 | Liu et al. |
| 2008/0198231 A1 | 8/2008 | Ozdemir et al. |
| 2009/0033745 A1 | 2/2009 | Yeredor et al. |
| 2009/0222388 A1 | 9/2009 | Hua et al. |
| 2009/0243844 A1 | 10/2009 | Ishidera |
| 2009/0268030 A1 | 10/2009 | Markham |
| 2010/0026802 A1 | 2/2010 | Titus et al. |
| 2010/0079594 A1 | 4/2010 | Voglewede et al. |
| 2010/0111377 A1 | 5/2010 | Monroe |
| 2010/0135643 A1 | 6/2010 | Fleming |
| 2010/0182428 A1 | 7/2010 | Lu et al. |
| 2010/0318566 A1 | 12/2010 | Yoshio et al. |
| 2010/0321183 A1 | 12/2010 | Donovan et al. |
| 2011/0001812 A1 | 1/2011 | Kang |
| 2011/0128374 A1 | 6/2011 | Shellshear et al. |
| 2011/0134240 A1 | 6/2011 | Anderson et al. |
| 2011/0211070 A1 | 9/2011 | Shu et al. |
| 2012/0008836 A1 | 1/2012 | Bobbitt et al. |
| 2012/0076356 A1 | 3/2012 | Li et al. |
| 2012/0127314 A1 | 5/2012 | Clements |
| 2012/0194676 A1 | 8/2012 | Laganiere et al. |
| 2012/0208592 A1 | 8/2012 | Davis et al. |
| 2012/0229647 A1 | 9/2012 | Calman et al. |
| 2012/0233032 A1 | 9/2012 | Calman et al. |
| 2012/0233033 A1 | 9/2012 | Calman et al. |
| 2012/0262575 A1 | 10/2012 | Champagne et al. |
| 2012/0311564 A1 | 12/2012 | Khalid |
| 2012/0324061 A1 | 12/2012 | Parsons et al. |
| 2012/0327241 A1 | 12/2012 | Howe |
| 2013/0041961 A1 | 2/2013 | Thrower, III et al. |
| 2014/0129942 A1 | 5/2014 | Rathod |
| 2014/0285660 A1 | 9/2014 | Jamtgaard et al. |
| 2015/0189240 A1 | 7/2015 | Shmueli |
| 2017/0200052 A1 | 7/2017 | Carey |

FOREIGN PATENT DOCUMENTS

| | | | |
|---|---|---|---|
| JP | 2013513336 A | | 4/2013 |
| RU | 83675 U1 | | 6/2009 |
| RU | 2382408 C2 | | 2/2010 |
| RU | 2459267 C2 | | 8/2012 |
| WO | 2007139994 A2 | | 12/2007 |
| WO | 2009111498 A2 | | 9/2009 |
| WO | 2011001180 A1 | | 1/2011 |
| WO | 2011071720 A1 | | 6/2011 |
| WO | 2012102909 A1 | | 8/2012 |
| WO | 2012170551 A2 | | 12/2012 |
| WO | 2013030296 A1 | | 3/2013 |
| WO | 2014155958 A1 | | 10/2014 |

OTHER PUBLICATIONS

Daniel A. Vaquera et al., "Attribute-Based People Search," Chapter 14, Intellegent Video Surveillance: Systems and Technology, published Dec. 7, 2009, pp. 387-405.

Extended European Search Report issued in corresponding European Patent Application No. 14723302.7 dated Mar. 2, 2016, 11 pages.

Extended European Search Report for application No. EP 14 76 4242 dated Aug. 26, 2015, 9 pages.

International Preliminary Search Report for corresponding PCT Application Serial No. PCT/US2014/034633, dated Oct. 29, 2015, 7 pages.

International Preliminary Search Report for PCT Application Serial No. PCT/US2013/070067, dated Sep. 15, 2015, 6 pages.

"Configuration Backup Restore", Jun. 30, 2010, XP055127450, retrieved from the Internet: URL: https:\\downloads.avaya.com/css/P8/documents/100088380.

International Search Report for PCT Application Serial No. PCT/US2014/034633, dated Dec. 2, 2014, 4 pages.

International Search Report and Written Opinion dated Sep. 1, 2016, in connection with International Application No. PCT/US16/45371 (12 pages).

Extended European Search Report dated Nov. 22, 2016, in connection with EP Application No. 16193237, 7 pages.

"Real-time Monitoring for Crowd Counting using Video Surveillance and Gis," H. Song et al., IEEE, 2nd International Conference on Remote Sensing, Environment and Transportation Engineering (RSETE), Jun. 1, 2012, 4 pages.

Smith, K., et al. "Detecting Abandoned Luggage Items in a Public Space," IEEE Performance Evaluation of Tracking and Surveillance Workshop (PETS), IDIAP Research Report, Jun. 2006, pp. 1-14.

Russian Office Action dated Jan. 18, 2017 in corresponding Russian Patent Application No. 2015147449 together with English translation, 12 pages.

Russian Office Action dated May 2, 2017 in corresponding Russian Patent Application No. 2015147449 with English translation, 8 pages.

Russian Office Action dated Oct. 23, 2017 in corresponding Russian Patent Application No. 2015147449, together with English translation, 12 pages.

International Preliminary Report on Patentability and Written Opinion of the International Searching Authority Issed in Int'l Appl. No. PCT/US2016/045371 dated Feb. 15, 2018 (10 pages).

European Examination Report issued in Appl. No. EP 14723302.7 dated Mar. 2, 2018 (5 pages).

Canadian Office Action issued in Appl. No. CA 2,851,732 dated Dec. 12, 2017 (4 pages).

Clifford et al.: "Attention, Shoppers: Store is Tracking Your Cell," The New York Times, available at https://www.nytimes.com/2013/07/15/business/attention-shopper-stores-are-tracking-your-cell.html?_r=1& [retrieved on Aug. 1, 2018].

Supplementary European Search Report dated Jul. 6, 2018 issued in corresponding EP Appln. No. 16833814.3.

Canadian Office Action dated May 25, 2018 issued in corresponding CA Appln. No. 2,973,866.

European Office Action dated Jul. 9, 2019 issued in corresponding EP Appln. No. 16 833 814.3.

Decision to Refuse a European Communication dated Dec. 2, 2019 issued in corresponding EP Appln. No. 14723302.7.

Brazilian Office Action dated Feb. 27, 2020 corresponding to counterpart Patent Application BR 112015026374.

Russian Office Action dated Oct. 14, 2019 containing a Search Report issued in corresponding RU Appln. No. 2018104654.

European Search Report dated May 14, 2020 issued in corresponding European Appln. No. 20153816.2.

Thailand Office Action dated May 25, 2020 issued in corresponding Thailand Appln. No. 1501006385.

Japanese Office Action dated Jul. 20, 2020 issued in corresponding JP Appln. No. 2018-526490.

Brazilian Office Action dated Aug. 17, 2020 issued in corresponding BR Appln. No. BR112018002281-0.

European Examination Report dated Sep. 24, 2020 issued in corresponding EP Appln. No. 16 193 237.1.

Canadian Office Action dated Nov. 25, 2020 issued in corresponding CA Appln. No. 3,056,190.

Extended European Search Report dated Dec. 11, 2020 issued in corresponding EP Appln. No. 20201200.1.

Canadian Office Action dated Oct. 26, 2021 issued in corresponding CA Appln. No. 3,056,190.

VIDEO IDENTIFICATION AND ANALYTICAL RECOGNITION SYSTEM

CROSS-REFERENCE TO RELATED APPLICATIONS

The present application is a continuation of U.S. patent application Ser. No. 14/256,385, filed on Apr. 18, 2014, claims priority to, and the benefit of, U.S. Provisional Application Ser. No. 61/813,942, filed on Apr. 19, 2013. The disclosures of each of which are herein incorporated by reference in their entirety.

BACKGROUND

1. Technical Field

The following relates to video observation, surveillance and verification systems and methods of use. The specific application may work in conjunction with surveillance systems, street cameras, personal video, in-store camera systems, parking lot camera systems, etc. and is configured to provide real time and/or post time data analysis of one or more video streams.

2. Background of Related Art

Companies are continually trying to identify specific user behavior in order to improve the throughput and efficiency of the company. For example, by understanding user behavior in the context of the retail industry, companies can both improve product sales and reduce product shrinkage. Focusing on the latter, employee theft is one of the largest components of retail inventory shrink. Therefore, companies are trying to understand user behavior in order to reduce and ultimately eliminate inventory shrinkage.

Companies have utilized various methods to prevent employee shrinkage. Passive electronic devices attached to theft-prone items in retail stores are used to trigger alarms, although customers and/or employees may deactivate these devices before an item leaves the store. Some retailers conduct bag and/or cart inspections for both customers and employees while other retailers have implemented loss prevention systems that incorporate video monitoring of POS transactions to identify transactions that may have been conducted in violation of implemented procedures. Most procedures and technologies focus on identifying individual occurrences instead of understanding the underlying user behaviors that occur during these events. As such, companies are unable to address the underlying condition that allows individuals to commit theft.

Surveillance systems, street camera systems, store camera systems, parking lot camera systems, and the like are widely used. In certain instances, camera video is continually streaming and a buffer period of 8, 12, 24, 48 hours, for example, is used and then overwritten should a need not arise for the video. In other systems, a longer period of time may be utilized or the buffer is weeks or months of data being stored and saved for particular purposes. As can be appreciated, when an event occurs, the video is available for review and analysis of the video data. In some instances, the video stream captures data and analyzes various pre-determined scenarios based upon automatic, user input, or programming depending upon a particular purpose. For example, the video may be programmed to follow moving objects from entry into a store and throughout the store for inventory control and/or video monitoring of customers.

In other instances, police, FBI or rescue personal need to review the various camera systems in a particular area or arena for investigative purposes, e.g., to track suspects, for car accident review, or other video evidence necessary to their investigation. As is often the case, snippets of video from various camera systems throughout the area can be critical in piecing together a visual map of the event in question. In other scenarios, an individual's habits or behaviors may become suspicious and deserved of monitoring or tracking for real-time analysis and alerts and/or post time investigative analysis.

There exists a need to further develop this analytical technology and provide real time and post time analysis of video streams for security and investigative purposes.

SUMMARY

According to an aspect of the present disclosure, an analytical recognition system is provided. The analytical recognition system includes one or more video cameras configured to capture video and a video analytics module configured to perform real-time video processing and analyzation of the captured video and generate non-video data. The video analytic module includes one or more algorithms configured to identify an abnormal situation. Each abnormal situation alerts the video analytics module to automatically issue an alert and track one or more objects or individuals by utilizing the one or more video cameras. The abnormal situation is selected from the group consisting of action of a particular individual, non-action of a particular individual, a temporal event, and an externally generated event.

In any one of the preceding aspects, the video analytics module identifies and stores in a database one or more characteristics of the particular individual for future recognition by the video analytics module and the one or more algorithms to identify an abnormal situation. The one or more characteristics of the particular individual may be selected from the group consisting of hairstyle, tattoos, piercings, clothing, logos, contrasting colors, gang-related indicia, and jewelry.

In any one of the preceding aspects, the video analytics module stores the captured video in a database accessible by a user and wherein the user identifies one or more characteristics of the particular individual for future recognition by the video analytics module and the one or more algorithms to identify an abnormal situation.

In any one of the preceding aspects, the video analytics module identifies and stores in a database one or more characteristics of the particular individual for future recognition by the video analytics module and the one or more algorithms to identify an abnormal situation and issue an alert wherein the video analytics module connects to an array of cameras organized in a network to analyze captured video.

In any one of the preceding aspects, the one or more characteristics of the particular individual may be selected from the group consisting of hairstyle, tattoos, piercings, clothing, logos, contrasting colors, gang-related indicia, and jewelry.

In any one of the preceding aspects, the one or more characteristics of the particular individual includes a person's gait. Each person's gait may be determined based on a combination of one or more of the following walking variables including: limp, shuffle, head angle, stride, hand/arm sway, hand gestures, walk velocity, step frequency, angle between feet, and hand/arm position.

According to another aspect of the present disclosure, an analytical recognition system is provided and includes one or more video cameras configured to capture a video sequence of a physical space and a video analytics module configured to perform real-time video processing and analyzation to determine a crowd parameter by automated processing of the video sequence of the physical space. The video analytic module includes one or more algorithms configured to determine a rate of change in the crowd parameter.

In any one of the preceding aspects, the crowd parameter may be a real-time crowd count or a real-time crowd density estimation.

In any one of the preceding aspects, the when the rate of change in the crowd parameter exceeds a predetermined threshold, the video analytics module automatically issues an alert.

In any one of the preceding aspects, the rate of change in the crowd parameter is indicative of crowd convergence. When the rate of change in the crowd parameter is indicative of crowd convergence, the video analytics module may alert security of a potential flash mob or gang robbery.

In any one of the preceding aspects, the rate of change in the crowd parameter is indicative of crowd divergence. When the rate of change in the crowd parameter is indicative of crowd divergence, the video analytics module may alert security of a potentially hazardous situation or criminal activity.

In any one of the preceding aspects, the video analytics module is connected to an array of cameras organized in a network and wherein upon issuance of an alert each camera in the network is utilized to track one or more objects or individuals. An owner of one of the cameras in the array of cameras forming the network may opt on a subscription basis for receiving particular alerts or being part of the camera network.

DEFINITIONS

The following definitions are applicable throughout this disclosure (including above).

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan/tilt/zoom (PTZ) camera; and a video sensing device. A video camera may be positioned to perform observation of an area of interest.

"Video" may refer to the motion pictures obtained from a video camera represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

"Video data" is a visual portion of the video.

"Non-video data" is non-visual information extracted from the video data.

A "video sequence" may refer to a selected portion of the video data and/or the non-video data.

"Video processing" may refer to any manipulation and/or analysis of video data, including, for example, compression, editing, and performing an algorithm that generates non-video data from the video.

A "frame" may refer to a particular image or other discrete unit within video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant 123 (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic. In this description, the terms "software" and "code" may be applicable to software, firmware, or a combination of software and firmware.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon. "Non-transitory" computer-readable medium include all computer-readable medium, with the sole exception being a transitory, propagating signal.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

"Real time" analysis or analytics generally refers to processing real time or "live" video and providing near instantaneous reports or warnings of abnormal conditions (pre-programmed conditions), abnormal scenarios (loitering, convergence, separation of clothing articles or backpacks, briefcases, groceries for abnormal time, etc.) or other scenarios based on behavior of elements (customers, patrons, people in crowd, etc.) in one or multiple video streams.

"Post time" analysis or analytics generally refers to processing stored or saved video from a camera source (from a particular camera system (e.g., store, parking lot, street) or other video data (cell phone, home movie, etc.)) and providing reports or warnings of abnormal conditions (post-programmed conditions), abnormal scenarios (loitering, convergence, separation of clothing articles or backpacks, briefcases, groceries for abnormal time, etc. or other scenarios based on behavior of elements (customers, patrons, people in crowd, etc.) in one or more stored video streams.

DETAILED DESCRIPTION

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

Additionally, the present disclosure may be described herein in terms of functional block components, code listings, optional selections, page displays, and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, linux, and/or Android®.

Further, it should be noted that the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

The present disclosure is described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general-purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

Figure 1:
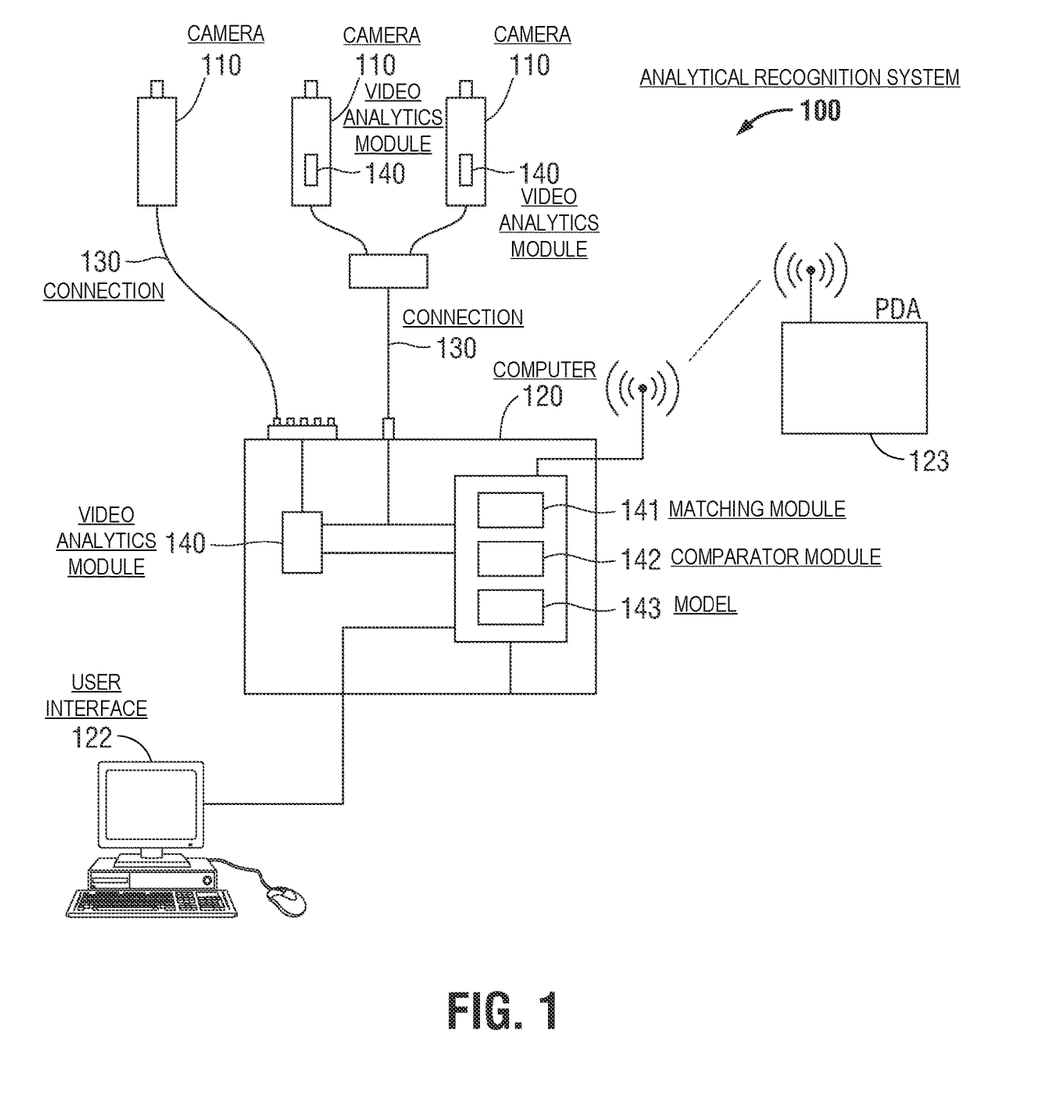
FIG. 1 is a system block diagram of an embodiment of a video observation, surveillance and verification system in accordance with the present disclosure.

With reference to FIG. 1, an analytical recognition system including video observation, surveillance and verification according to an embodiment of this disclosure is shown as 100. System 100 is a network video recorder that includes the ability to record video from one or more cameras 110 (e.g., analog and/or IP camera). Video cameras 110 connect to a computer 120 across a connection 130. Connection 130 may be an analog connection that provides video to the computer 120, a digital connection that provides a network connection between the video camera 110 and the computer 120, or the connection 130 may include an analog connection and a digital connection.

Each video camera 110 connects to the computer 120 and a user interface 122 to provide a user connection to the computer 120. The one or more video cameras 110 may each connect via individual connections and may connect through a common network connection, or through any combination thereof.

System 100 includes at least one video analytics module 140. A video analytics module 140 may reside in the computer 120 and/or one or more of the video cameras 110. Video analytics module 140 performs video processing of the video. In particular, video analytics module 140 performs one or more algorithms to generate non-video data from video. Non-video data includes non-video frame data that describes content of individual frames such as, for example, objects identified in a frame, one or more properties of objects identified in a frame and one or more properties related to a pre-defined portions of a frame. Non-video data may also include non-video temporal data that describes temporal content between two or more frames. Non-video temporal data may be generated from video and/or the non-video frame data. Non-video temporal data includes temporal data such as temporal properties of an object identified in two or more frames and a temporal property of one or more pre-defined portions of two or more frames. Non-video frame data may include a count of objects identified (e.g., objects may include people and/or any portion thereof, inanimate objects, animals, vehicles or a user defined and/or developed object) and one or more object properties (e.g., position of an object, position of any portion of an object, dimensional properties of an object, dimensional properties of portions and/or identified features of an object) and relationship properties (e.g., a first object position with respect to a second object), or any other object that may be identified in a frame. Objects may be identified as objects that appear in video or objects that have been removed from video. Objects may be identified as virtual objects that do not actually appear in video but which may be added for investigative purposes, training purposes, or other purposes.

Video analytics module 140 may be positioned in camera 110 to convert video-to-video data and non-video data and the camera 110 and to provide the video data and the non-video data to the computer 120 over a network. As such, the system 100 distributes the video processing to the edge of the network thereby minimizing the amount of processing required to be performed by the computer 120.

Computer 120 includes computer-readable medium comprising software for monitoring user behavior, which software, when executed by a computer 120, causes the computer 120 to perform operations. User interface 122 provides an interface to the computer 120. User interface 122 may connect directly to the computer 120 or connect indirectly to the computer 120 through a user network.

A user behavior is defined by an action, an inaction, a movement, a plurality of event occurrences, a temporal event, an externally generated event, or any combination thereof. A particular user behavior is defined and provided to the computer 120.

An action may include picking up an object wherein the object has been placed or left at a particular location. An action may include moving a particular object such as the opening of a door, drawer or compartment. An action may include positioning (or repositioning) a body part such as placing a hand in a pocket or patting oneself repeatedly at a particular location (an indication that a weapon may be concealed). The action may include moving to a particular position, a first individual engaging a second individual and/or moving a hand, arm, leg and/or foot in a particular motion. An action may also include positioning a head in a particular direction, such as, for example, looking directly at security personnel or a security camera 110. Various other examples have been discussed hereinabove.

Inaction may include failing to reach for an object wherein an object is dropped or positioned and the individual (e.g., object) does not retrieve the dropped object. Inaction may also include failing to walk to a particular location or failure to perform a particular task. For example, confirming that a security door is locked would require the action of approaching the door and the action of striking the door to ensure that it would not open. As such, the user behavior may be defined as the inaction of approaching the door and/or the inaction of striking the door to confirm that the door will not open. Various other examples of inaction have been discussed hereinabove.

A temporal event may include the identification of a customer that abruptly leaves a store, an individual dwelling at a store entrance or exit, an individual remaining in a particular location for a time period exceeding a threshold. Various other examples of a temporal event have been discussed hereinabove.

A user may identify a particular user behavior and provide and/or define characteristics of the particular user behavior in the computer 120. Computer 120 receives non-video data from the camera 110 wherein the non-video data includes behavioral information data. The particular user behavior may be defined by a model 143 of the behavior where the model 143 includes one or more attribute such a size, shape, length, width, aspect ratio or any other suitable identifying or identifiable attribute (e.g., tattoo or other various examples discussed herein). The computer 120 includes a matching algorithm or matching module 141, such as a comparator, that compares the defined characteristics and/or the model 143 of the particular user behavior with user behavior in the defined non-video data. Indication of a match by the matching algorithm or module 141 generates an investigation wherein the investigation includes the video data and/or non-video data identified by the matching algorithm 141. Investigations are a collection of data related to an identified event, and generally document behaviors of interest. As such, investigations require further review and investigation to understand the particular behavior.

The investigation may be sent to other cameras or systems on a given network or provided over a community of networks to scan for a match or identify and alert. Matching algorithm 141 may be configured as an independent module or incorporated into the video analytics module 140 in the computer 120 or in any cameras 110. The video analytics module 140 may also include a comparator module 142 configured to compare the model 143 of the particular user behavior and the non-video data.

A particular user behavior may be defined as positioning a head toward an observation camera 110 exceeds a preset period or positioning of a head directly toward a manager's office exceeds a preset period. This particular user behavior is indicative of a customer trying to identify the observation cameras 110 in a store in an effort to prevent being detected during a theft or an employee trying to determine if a manager is observing his/her behavior. The video analytics module 140 performs an algorithm to generate non-video data that identifies the head position of objects. The video analytic module 140 may also provide a vector indicating the facial and/or eye direction. The matching algorithm 141 searches the non-video data to determine if the head position and/or vector indicating facial direction exceeds the preset period. A match results in the generation of an investigation.

Figure 2:
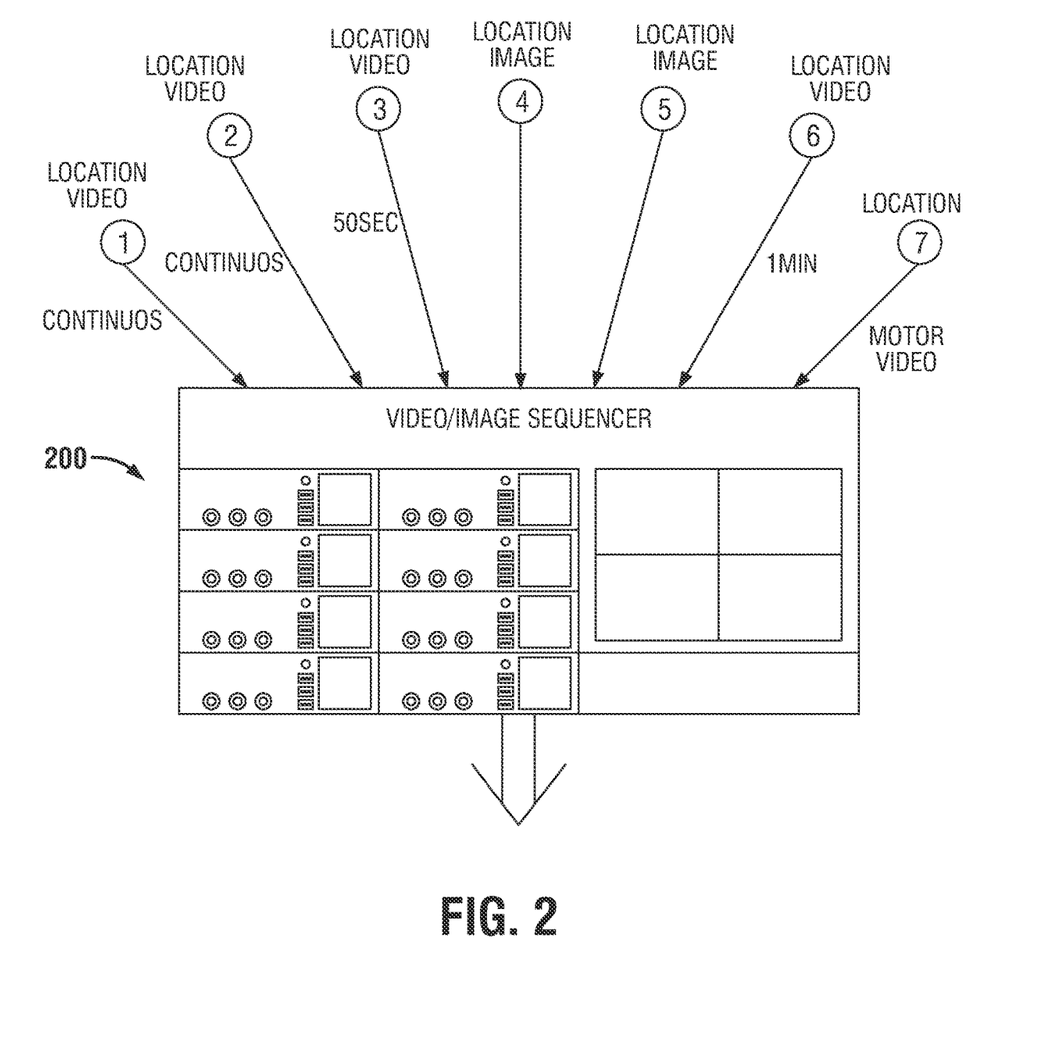
FIG. 2 is a video/image sequencer according to an embodiment of the present disclosure.
Figure 3:
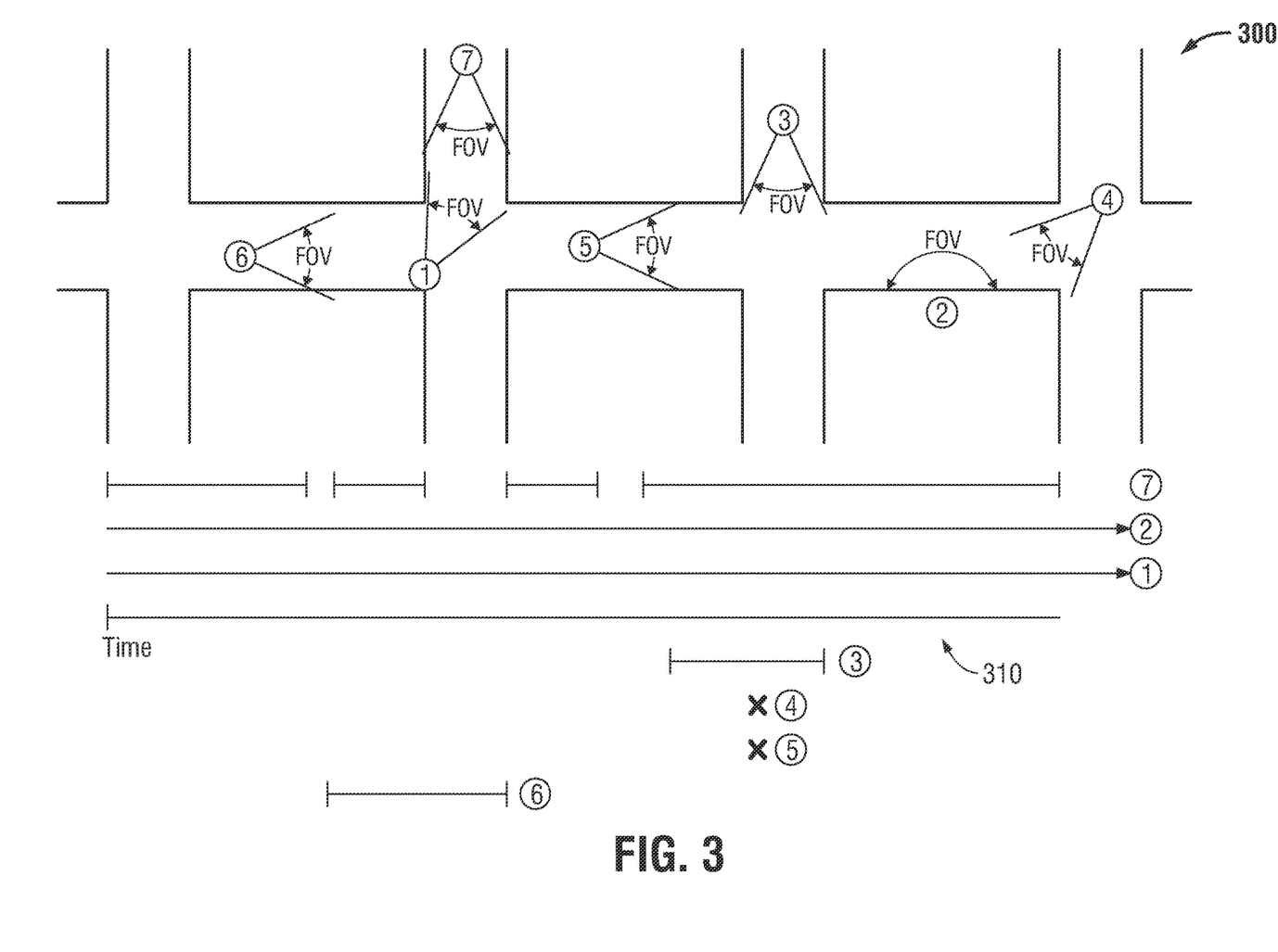
FIG. 3 is an illustration of an image map and an associated timeline generated by the sequencer of FIG. 2.

With reference to FIG. 2, a video/image sequencer according to an embodiment of this disclosure is shown as 200. Sequencer 200 is configured to receive video, video data, non-video data, video sequences and/or still images from various sources of video. For example, continuous video may be provided from locations 1 and 2, while motion only data may be provided from location 7. Video clips of short duration may be provided from locations 3 and 6 and still images may be provided from locations 4 and 5. This data may be communicated to the sequencer 200 by any suitable communications medium (e.g., LAN, WAN, Intranet, Internet, hardwire, modem connection, wireless, etc.).

Sequencer 200 generates a time-stamp from data provided with the video and/or image data. The time-stamp may be embedded into the video and/or image data, provided as part of the video and/or image, or a time-stamp may be provided with the file containing the video and/or image data. Alternatively, sequencer 200 may be configured to receive user-entered data, included time-stamp information, associated with each input.

Sequencer 200 may additionally, or alternatively, generate a geo-location from the data provided with the video and/or image date. Geo-location information may be embedded into the video and/or image data, provided as part of the video and/or image, or provided with the file containing the video and/or image data. For example, video and/or image may contain a land-marking feature that may be used to identify the location where the picture was taken.

Sequencer 200 may additionally, or alternatively, generate field-of-view data (hereinafter "FOV data") for video and/or image data. FOV data may be obtained from the camera location information, obtained from the information contained within the video (e.g., landmark identification) and/or entered by a user.

Figure 4:
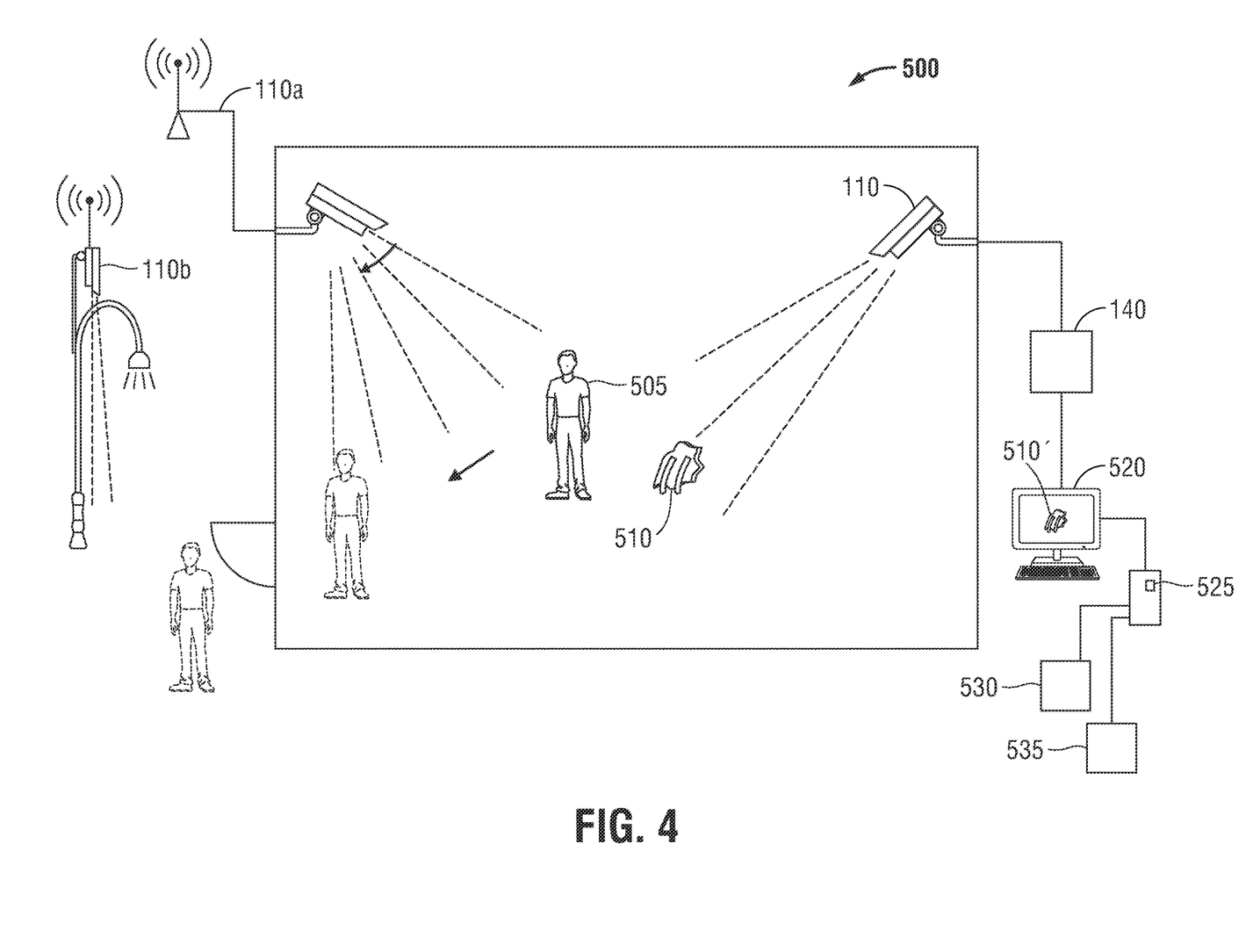
FIG. 4 is a schematic illustration of an analytical recognition system used for object identification and tracking according to another embodiment of the present disclosure.

FIG. 4 is an illustration of an image map 300 and an associated timeline 310 generated by the sequencer 200. Sequencer 200 may be configured to utilize the time-stamp data, geo-location data and/or FOV data to assemble an image map 300 and timeline 310 from all video and image data (or any portions thereof) provided to the sequencer 200.

A user may provide the sequencer 200 with a particular time and/or timeframe and the sequencer provides all video and/or images related to that particular time. Time and/or timeframe may be selected on the timeline 310 and the image map 300 may be updated to include all video and/or image data related to the selected time and/or timeframe.

A user may additionally, or alternatively, provide the sequencer 200 with a selected location and the sequencer provides all video and/or image data related to that particular location. Selected locations may be selected on the image map 300 or provided as geo-location data to the sequencer 200.

A user may additionally, or alternatively, provide the sequencer 200 with a particular time and/or timeframe in addition to a geo-location to further narrow and isolate all video and/or image data related to that particular location.

After a particular time, timeframe and/or geo-location is used to identify video and/or image data, the user may utilize the searching algorithms, methods and system described herein to identify particular items of interest, patterns and/or individuals contained within the video and/or image data.

It is important to note that the present disclosure goes beyond facial recognition software (which may be utilized in conjunction herewith) and provides additional algorithms and analytics for tracking and/or investigative purposes as explained below. In addition, it is not necessary in certain instances that facial recognition be utilized to flag or track someone or something and the presently-described system may be employed without facial recognition software or algorithms which may prove insensitive to certain moral, federal or local laws.

The present disclosure also relates to an analytical recognition system for real time/post time object tracking based on pre-programmed parameters, e.g., real time and post time analysis, recognition, tracking of various pre-programmed (or post programmed) known objects or manually programmed objects based on shape, color, size, number of certain objects on a person(s), oddity for a particular circumstance (e.g., winter coat in 80° heat), similarity of particular object over the course of a particular time frame (similar items, e.g., backpacks, within particular area), separation of a sensitive object(s) from person for a preset period of time, odd object in particular area, objects placed near sensitive objects, similar objects being placed in similar areas and separated from person, particular color contrasts and combinations (e.g., red shirt exposed under black shirt, or white hat on black hair).

Programmed objects may include objects with a particular known shape, size color or weight (as determined by number of people carrying, gait of person carrying, how the object is being carried, etc.) or based upon a look up library of objects and mapping algorithm. These objects may be pre-programmed into the analytical software and tracked in real time and/or post time for analysis. Manually programmed objects may be inputted into the software by color, size, shape, weight, etc. and analyzed and tracked in real time and/or post time to determine abnormal conditions or for other purposes. Manually programmed objects may be uploaded for analysis in real time, e.g., facial recognition images, tattoos, piercings, logos, or other indicia as explained in more detail below. Additionally, a user generated item and/or image may be generated from video data (e.g., frame data) and/or a still image and provided for analytics. For example and as shown in the an analytical recognition system 500 of FIG. 4, an object 510 (e.g., hat, backpack, outfit, or any identifiable feature) identified in a still image and/or a video frame (or identified as a result of one of the abnormal conditions described herein) may be isolated from an individual 505 for a preset amount of time (temporal event) and provided as a user generated item 510' for identification in live-video 520 or searched and identified in stored video 525, e.g., video frames and/or still images.

System 500 may include video analytics module 140 that is configured to perform real time and/or post time analysis of video and tracking of every person with a backpack 510 within a particular area or within a particular camera view 505. Suspicious behavior and/or behavior of interest of one or more persons may be tracked and recorded and analyzed in either real time or post time. For example as identified in FIG. 5, if the backpack 510 is separated from a person 505 and left for a predetermined period of time, this video may be flagged for real time alerts and/or post time analysis. The object, e.g., backpack 510, might be flagged, time stamped and/or separated into an individual video stream for analysis later. A user in real time or post time analysis can zoom in for high-definition tracking or for incorporation into a video/image sequencer 200 as discussed herein. The person 505 dropping a preprogrammed suspicious object, e.g., backpack 510 (or any other object that is recognized by a library of images 530, user generated image/object 535 (via an input device) or a certain mapping algorithm or module 140) may be tracked and analyzed for real time alerts and/or post time analysis. The system 500 may both track the object 510 and flag and track the person 505 for real time or post time analysis through one or more cameras 110 or a network of cameras 110, 110a, 110b, etc.

Figure 5:
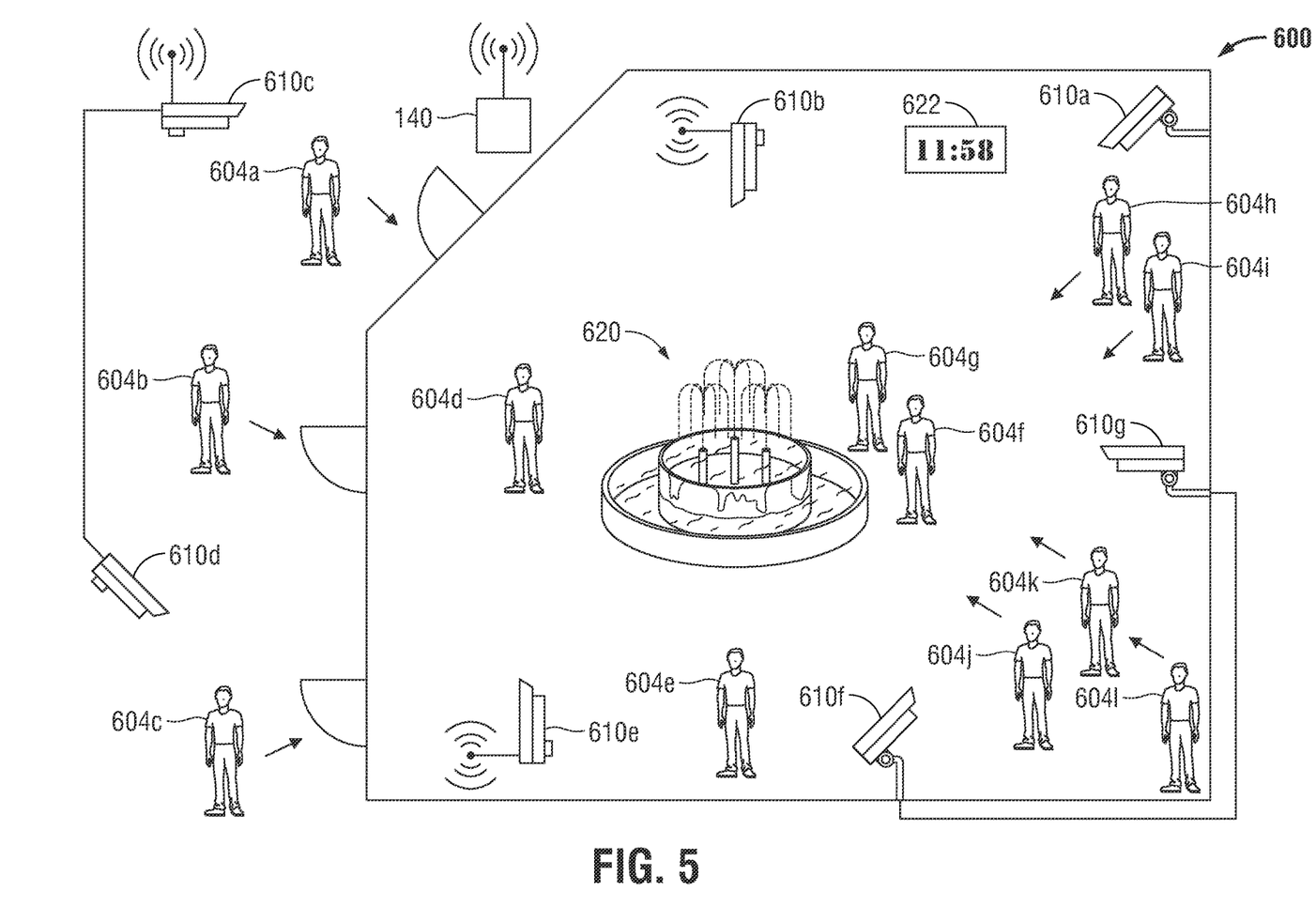
FIG. 5 is a schematic illustration of an analytical recognition system used for convergence tracking according to another embodiment of the present disclosure.

In other example, the system 500 may flag and track in real time for alert purposes or post time analysis a person wearing a winter coat in the Summer, a long raincoat when sunny, etc. This would also be classified as an alert or abnormal condition.

The system 500 may be capable of combining pre-programmed analytics to alert for one or more (or a combination of) abnormal scenarios. For example, a person carrying a case capable of carrying an semi-automatic or automatic rifle and that person loitering outside of a sensitive building for a pre-determined period of time may be automatically flagged, tracked and an alert sent to security.

The system 500 may be capable of tracking and analyzing particular objects and the software or video analytics module 140 may be pre-programmed to identify the same objects in later obtained video streams and/or still images. For example, a person of particular importance is scheduled to have a press briefing or scheduled to arrive at a particular location at a specific time. The scheduled event is postponed (intentionally or unintentionally). The software or video analytics module 140 may be preprogrammed to recognize certain objects (or persons with objects 510 or user generated objects 535) appearing in newly generated video for the re-scheduled event. In certain instances, the original video from the original time of the scheduled event may be reviewed and a user may pre-program the software or video analytics module 140 to look for certain "repeat" objects 510 (backpacks, coats, hats, clothing, briefcases, persons, etc.) in the real time video footage of the now re-scheduled event. A person may also be classified as a loiterer and flagged for review at the later scheduled event. A warning can be sent to the security team reviewing the tapes in real time if that was a person of interest.

The video analytics module 140 may be configured to recognize abnormal patterns of behavior or unexpected patterns of behavior and alert security or investigators of potentially abnormal scenarios, events or conditions. The video may be configured for real-time analytics or post event analysis. For example, the video analytics module 140 can be programmed to recognize convergence patterns toward a particular geographical area and/or divergence patterns away from a particular geographical area. Global positioning software and vectoring may be utilized to accomplish this purpose. Recognition of convergent patterns and/or divergent patterns may be helpful in automatically recognizing potential flash mobs, mass robberies or other abnormal events. For example and as shown in FIG. 5, analytical recognition system 600 includes video analytics module 140 which may be configured to track an abnormal number of patrons 604a-604l arriving at a particular location 620 at or near a particular time 622. The video analytics module 140 may also be configured to tract abnormal velocity of patrons 604a-604l and/or individuals arriving or departing from a particular location 620. A typical arrival and/or departure velocity may be preset or obtained from an algorithm of previous individuals that may have arrived or departed from a particular location over a preset or variable amount of time. Deviation from the arrival and/or departure velocity may trigger an abnormal condition.

A security system 600 with the video analytics module 140 and one or more camera arrays or systems 610a-610g may be configured to recognize an abnormal number of people converging towards a particular geographical area 620 over a preset time. The video analytics module 140 may be configured to utilize vector analysis and/or image and data vector analysis algorithms and/or machine learning algorithms to assess one or more convergence patterns. Moreover, the system 600 may be configured to recognize similarities in clothing, age, articles being carried (e.g., briefcases, backpacks, other similar items) and alert security or investigators of a possible abnormal condition. This can be useful in recognizing so-called "flash mobs" or other highly sensitive situations during a parade, marathon, political speech, etc.

Divergence patterns and/or velocities may be used to identify unusual patterns of individuals departing from a particular area 620. For example, in the event of a panic-like situation the divergence velocity of individuals is expected to be greater than a preset or calculated average divergence velocity. As such, identification of one or more individuals leaving the particular area and/or situation at a velocity less than the average velocity or the panic-like velocity may indicate that the individual was not in a panic-like condition possibly due to the fact that he/she perpetrated or were aware of the particular panic-like situation. Moreover a person leaving an area with a higher than average velocity may be "running from an event", e.g., running from a robbery or away from an upcoming explosion.

The video analytics module 140 may also be configured to monitor web traffic and/or social media sites (Facebook®, Myspace®, LinkedIN®) relating to a particular location and/or event and provide alerts of that nature to security or combine web traffic relating to an event or geographic area with video analytics that recognize convergence patterns to alert of a potential flash mob or gang robbery. The video analytics module 140 may also work in reverse and access web traffic or various social media sites when a convergence pattern is recognized and ping one or more of these sites to gather additional information to possibly uncover more pattern activity or uncover a flash mob event at a particular location.

The video analytics module 140 may also be configured to monitor web traffic or social media sites for activities that precede a particular time stamp. For example, a social media posting conveys condolences for a particular event that coincides or precedes the particular event may indicate foreshadowing of the event and indicate prior knowledge of the upcoming event.

The system 600 and video analytics module 140 may be configured to analyze video from one or more street cameras, parking lot cameras, store/mall camera, or other camera systems 610a-610g to determine pre-programmed abnormal conditions or manually programmed conditions in real time. The system 600 may be configured to provide an alert if an abnormal number of cars are converging at a particular spot (e.g., shopping mall), and couple that information with footage from the parking lot surveillance cameras to ascertain how many people are converging on a particular store or place and couple that analytic with the in-store camera to determine loitering at a particular spot at a particular time or delta time. This is typical behavior of a flash mob or gang robbery. Again, the system 600 might tie into one or more social media sites for additional information and/or confirmation.

Similarly, the velocity patterns of the approaching cars, obtained from video, and/or the velocity at which individuals depart from their cars may also be indicative of abnormal condition.

Other examples of analytics that the video analytics module 140 may perform in real time and/or post time may relate to gang-type recognition. For example, the analytical recognition system 700 of FIG. 6 may be configured to recognize gang colors and/or color combinations and/or patterns and flag the video 718 and/or alert security if an abnormal number of individuals (or abnormal % of individuals) with particular colors or color combinations and/or patterns are converging on, or loitering in, a particular geographical area. The video analytics module 140 may be pre-programmed to recognize a particular characteristic or trait 715 of an individual or individuals 705a, e.g., clothing, head gear, pant style, shirt/coat colors, the manner it is worn, symbols, coat logos, tattoos, piercings, hair style, hand gestures, cars, motorbikes, etc. and alert security of an abnormal condition or a previous investigation stored as a previous image 725 in a computer 720. These individuals 705a may be flagged and tracked for a preset period of time or until he/she leaves the area. The overall image and characteristics 715 of a particular group of patrons in a crowd (similarities of colors, uniform, gear, clothing style, hair style, logos, piercings, tattoos, symbols, other gang-related indicia, cars, motorbikes or clothing, etc.) may be recognized and trigger an alert. The video analytics module 140 may provide an alert that x % of individuals in a particular crowd have a particular trait 715, e.g., same tattoo, red shirts on, have the same logo, hair style are carrying a specific object, etc. The video analytics module 140 may be configured to provide an alert based on an assessment that a predetermined number of individuals in a particular crowd have a particular trait 715.

Figure 6:
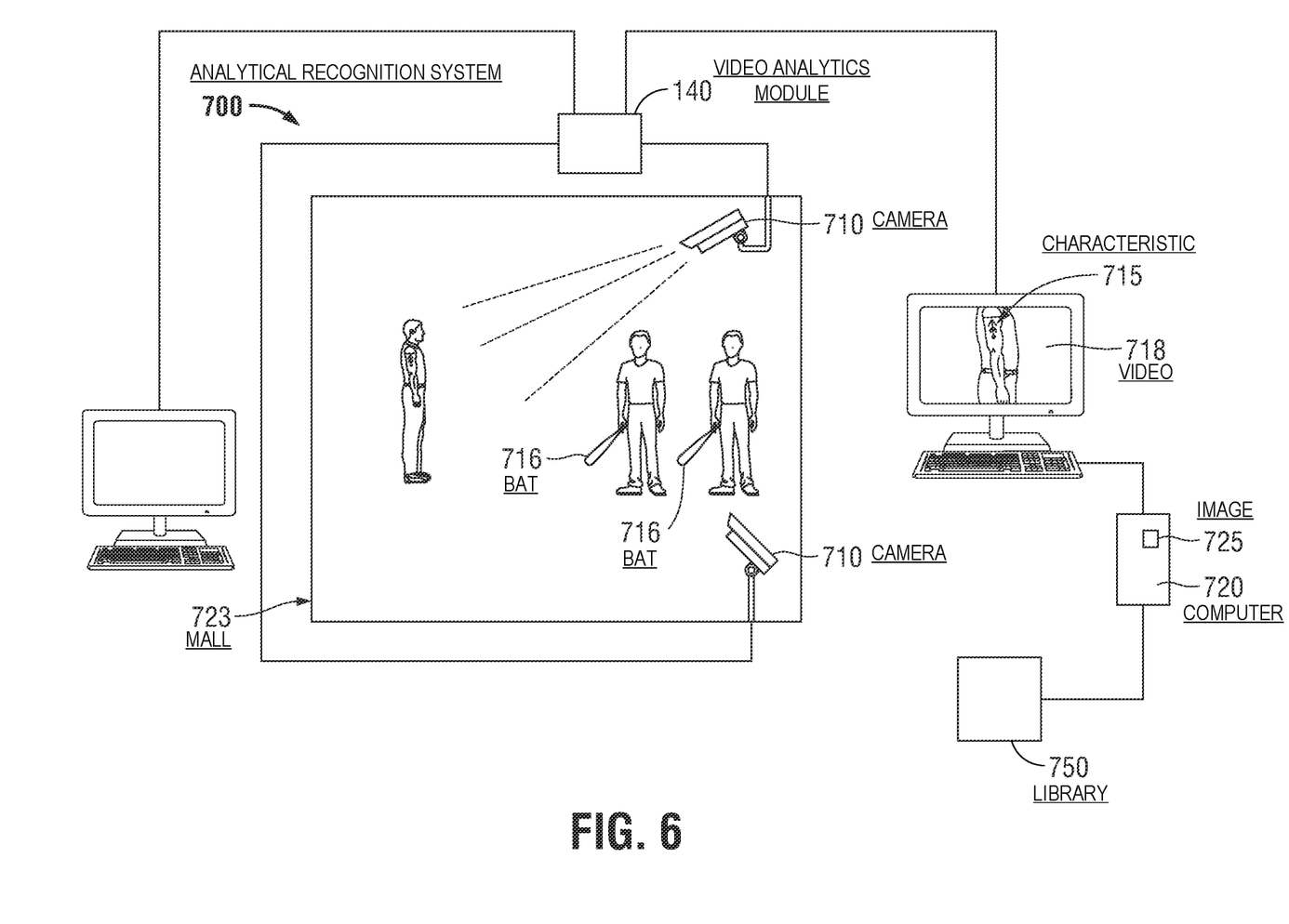
FIG. 6 is a schematic illustration of an analytical recognition system used for character trait recognition according to another embodiment of the present disclosure.

The video analytics module 140 may be configured to provide graphical representations of numerous abnormal conditions to better facilitate recognition of patterns or very high levels (and/or predetermined levels) of one or more abnormal conditions. This may allow a higher number of patterns to be tracked and analyzed by one or more individuals. The video analytics module 140 may also recognize contact between individuals wherein the contact may be physical contact (e.g., handshake, an embrace or exchange of an object) or contact may be non-contact (e.g., engage in conversation, prolonged eye-contact or engaging in other non-physical contact that would indicate acknowledgement therebetween).

Other alert-type conditions may relate to abnormal scenarios wherein the video analytics module 140 recognizes an object being carried by an individual 705b that is unusual for a particular area. For example as shown in FIG. 6, a person carrying a pitchfork or shovel (not shown) in a mall 723, or a group (705b and 705c) carrying bats 716 in mall 723 and converging on a particular area. Again, real-time analysis of the video would be most useful and provide security with an abnormal condition alert. Post analysis may be helpful for determining offenders should an event take place when authorities are called to assist.

With any of the aforedescribed scenarios or alerts noted herein, the video analytics module 140 may work in conjunction with a video library of images or algorithms 750 to trigger alerts or respond to queries. Additional images, such as a library images and/or user-generated images 750, may be provided as inputs to the video analytics module 140 and used to analyze video through the recognition aspects of the video analytics module 140. This may all happen in real time or during post time analysis. Again, queries may be entered depending upon a particular purpose and the system 100, 400, 500, 600, 700 and/or 800 can in real time or post time analyze video for the queried conditions.

The system 100, 400, 500, 600, 700 and/or 800 may be configured to perform three-dimensional face recognition. The system 100, 400, 500, 600, 700 and/or 800 may be manually programmed to recognize an individual or suspect 705a in an investigation (or prior felon) based on clothing type, piercings, tattoos, hair style, etc. (other than facial recognition which may also be utilized depending on authority of the organization (FBI versus local mall security)). An image of a suspect 705a may be scanned into the video analytics module 140 and items such as piercings, tattoos, hairstyle, logos, and headgear may be flagged and uploaded into the image database for analyzing later in real time or post time analysis. For example, if a thief 705a robs a convenient store and his/her facial image is captured onto one or more cameras 710, not only may his/her image be uploaded to all the store cameras 710, but other identifying information or characteristics or traits 715 as well, e.g., hair style, tattoos, piercings, jewelry, clothing logos, etc. If the thief 705a enters the store again, an alert will automatically be sent to security. Even if the system recognizes a similar tattoo or piercing pattern or logo 715 on a different person that person may be deemed a suspect for questioning by authorities. Again, this goes beyond mere facial recognition wherein that so-called different person would not necessarily be flagged and tracked.

The system 100, 400, 500, 600, 700 and/or 800 may also generate a library of individuals and/or patrons that regularly frequent or visit a particular location thereby eliminating the need to track these particular individuals and allowing the system 100, 400, 500, 600 or 700 to focus on identification and tracking of individuals not previously identified and saved in the library. The library of patrons (not shown) may also link to a Point-of-Sale (POS) system thereby validating that the individuals identified and stored in the library are regular patrons.

Figure 7:
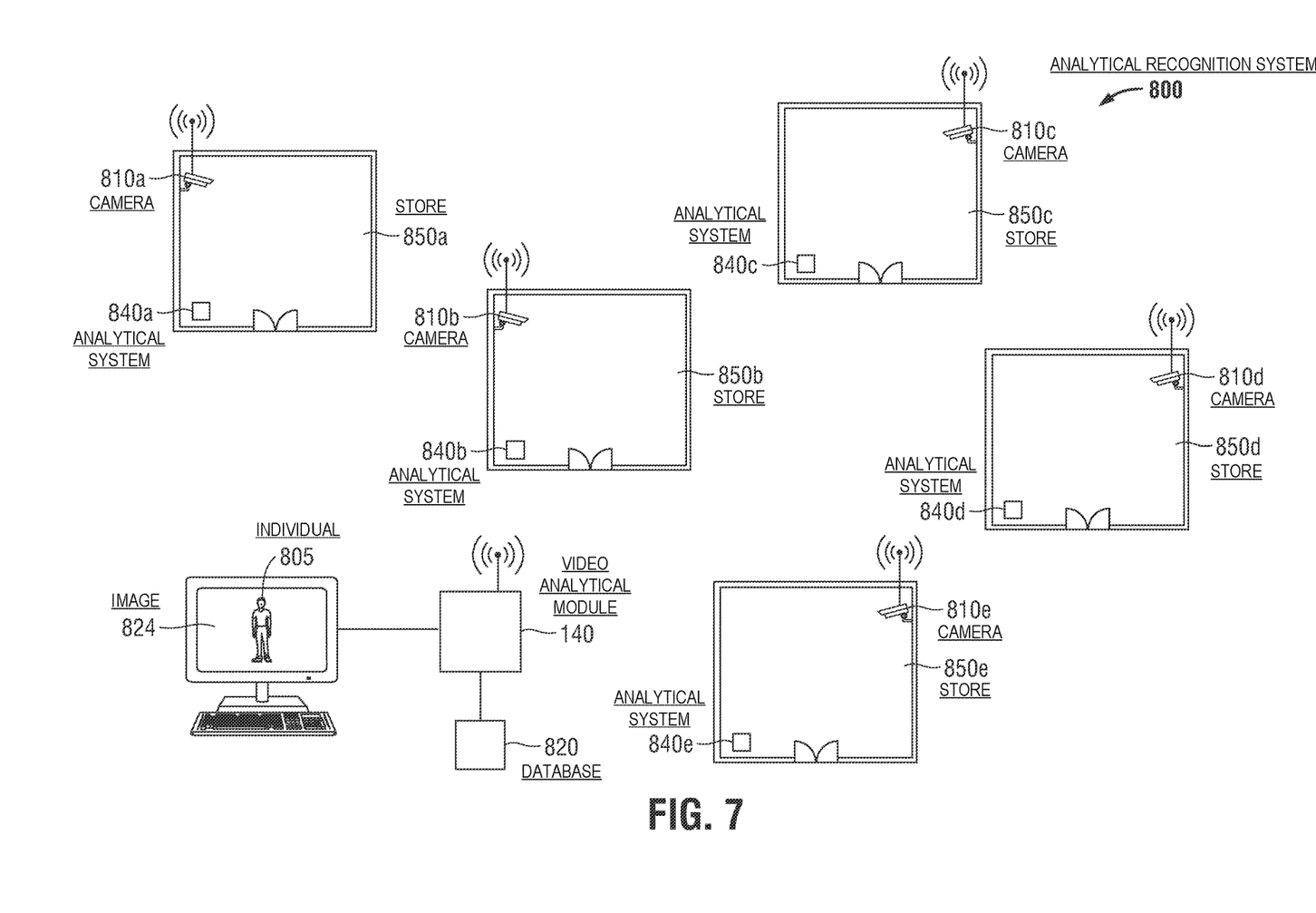
FIG. 7 is a schematic illustration of an analytical recognition system used for a community surveillance network according to another embodiment of the present disclosure.

As best shown in FIG. 7, another analytical recognition system 800 is shown with the video analytics module 140 being utilized with a chain of stores, a mall or a series of stores 850 in a town or community. The community of stores or a chain of stores 850a-850e is able to share video images 824 and other identifying information of characteristic or trait of known felons 805 across a network of cameras 810a-810e utilizing the same the video analytics module 140 (or uploading the image 824 and identifying information on an individual store analytical system 840a-840e). These local storeowners or store chains 850a-850e may be able to prevent additional losses by flagging and tracking known individuals 805 of particular interest (based on a prior characteristics or traits as described above and/or identifying information entered into an image and/or information database) once he/she 805 enters a store, e.g., store 850a. Alerts may be sent to local authorities of these individuals (or group of individuals) and they may be tracked throughout an entire network of cameras 810a-810e, including parking lot cameras, street cameras, etc. along a community network. Once an individual 805 is flagged and there is an alert, other information may be captured relating to car, car type, car route, accomplices, etc. Further, all cameras 810a-810e in the system 800 may be alerted to flag and track the individual 805 and accomplice in real time and/or for post time analysis.

The various described systems 100, 400, 500, 600, 700 and 800 may also be utilized to identify individuals with a "no contact" condition. For example, a building resident may have a restraining order issued by a court that prevents a particular individual from being within a certain proximity. The image, e.g., 824, may be entered into the system e.g., system 800 and the video analytics module 140 may identify the individual 805 and provide notice and/or documentation to the building resident and/or the authorities. Similarly, a government-generated database 820 may be provided to the system 800 wherein the database 820 includes a library of images 824 of individuals 805 identified in a particular legally mandated registration program.

A community may choose to set up a community network of cameras 810a-810e for this purpose. New owners of local businesses may opt to upload a particular felon's image 824 for analyzing (i.e., for local alerts) on a per occurrence subscription (e.g., dollar amount), e.g., a particularly violent felon's image 824 and additional identifying information may be of particular interest to an entire community for uploading on all networked cameras 810a-810e (or even stand alone systems) while a small time shoplifter may not be of interest.

The video analytics module 140 may also utilize gait as an indicator of an individual or suspect, limp, shuffle, head angle, stride, hand sway, hand gestures, etc. A person's gait is as individual as a fingerprint and may be used to identify disguised felons. Many variables contribute to an individual gait and this information can be uploaded to the video analytics module 140 (e.g., walk velocity, step frequency, angle between feet, hand/arm position, hand/arm sway, limp, shuffle, etc.)

The video analytics module 140 may also be configured to alert security if a certain number of known images or events or habits occurs within a particular time period (e.g., self patting of particular area(s) X number of times within preset time period, patting or clenching of a known area for carrying or hiding weapons, nervous twitching or rapid head turning X number of times, leering around corners, looking at video cameras X number of times within a preset time period, etc. The video analytics module 140 may be configured to alert security or provide information to a user based on an abnormal or excessive habit or event occurring within a preset time limit or a combination of any of the events occurring within a preset time period. For example, a person walking through a store with hand clenched atop pants with rapid head turning may trigger an alert or abnormal situation. In another example, security is flagged or highlighted (or otherwise identified in a certain area(s) by the system 100, 400, 500, 600, 700 and/or 800) and a suspect leering in that direction repeatedly or repeatedly turning his/her head in that direction may trigger an alert or abnormal situation. In another example, an individual shopping and/or lingering in an area of a store that is typically an area with short dwell times (e.g., dwell time for a male in the make-up area is typically short while dwell-time for a female is typically, if not always, long).

As mentioned above, the analytical recognition system 100, 400, 500, 600, 700 and/or 800 of the present disclosure may be utilized to determine gun or weapon detection by virtue of pre-programming certain habitual behavior into the video analytics module 140 and analyzing the same (in real time and/or post time). For example, a person repeatedly grabbing a certain area known to house weapons and walking with a certain gait (e.g., walking with a limp might indicate carrying a shotgun) may be an indication of the person carrying a weapon. This information may be analyzed with other identifying information or indicia (e.g., tattoo, gang color, gang symbol, logo, etc.) to trigger an alert or abnormal situation. In another example, an individual is wearing a trench coat when it is not raining or on a sunny day in the Summer and leering or head turning. In this instance, the video analytics module 140 would need some sort of sensory input regarding rain or temperature or sunshine (light) and/or a connection to a system that provides such data. The time of day might also become a trigger or additional event that is preprogrammed into the video analytics module 140 analytics to heighten "awareness" of the video analytics module 140 when triggering alerts, e.g., very late at night or past midnight when more robberies tend to occur.

In other examples, the video analytics module 140 may allow the security personal to query the analytical recognition system 100, 400, 500, 600, 700 and/or 800 in real time or post time: "How many people with red baseball caps have entered the store or area within the delta of 5-10 minutes?"; "How many people are converging on the central fountain at this time or over this delta time?"; "How many people have lingered at the fountain for delta minutes?" Other queries may include instructions: "Scan and recognize/flag/follow/track people wearing long pants or winter coats (when 90° degree Summer day)"; "Scan and recognize/flag/follow/track people wearing red hats"; "Scan and recognize/flag/follow/track people carrying multiple backpacks"; "Scan and recognize/flag/follow/track people who have left objects (e.g., backpacks unattended)—track person over system, multiple systems, flag location of object, etc."; "Scan and recognize/flag/follow/track people loitering near sensitive areas, leaving objects near sensitive areas—track person over system, multiple systems, flag location; and/or "Alert if a delta number of unattended objects left at preset time or over preset time".

In another example, the video analytics module 140 may be configured to perform real-time video processing and analyzation to determine a crowd parameter (e.g., a real-time crowd count or a real-time crowd density estimation) by automated processing of the video sequence of a physical space. The video analytic module 140 may include one or more algorithms configured to determine a rate of change in the crowd parameter. The rate of change in the crowd parameter may be indicative of crowd convergence or crowd divergence.

When the rate of change in the crowd parameter exceeds a predetermined threshold, the video analytics module 140 automatically issues an alert. For example, when the rate of change in the crowd parameter is indicative of crowd convergence, the video analytics module 140 may alert security of a potential flash mob or gang robbery. The video analytics module 140 may be configured to utilize vector analysis and/or image and data vector analysis algorithms and/or machine learning algorithms to assess one or more convergence patterns.

The video analytics module 140 may be connected to an array of cameras 610a-610g organized in a network, and upon issuance of an alert each camera in the network may be utilized to track one or more objects or individuals (e.g., patrons 604a-604l shown in FIG. 6). When the rate of change in the crowd parameter is indicative of crowd divergence, the video analytics module 140 may alert security of a potentially hazardous situation or criminal activity.

As various changes could be made in the above constructions without departing from the scope of the disclosure, it is intended that all matter contained in the above description shall be interpreted as illustrative and not in a limiting sense. It will be seen that several objects of the disclosure are achieved and other advantageous results attained, as defined by the scope of the following claims.

What is claimed is:

1. An analytical recognition system, comprising:
   at least one video camera configured to capture a video sequence of a physical space; and
   a video analytics module configured to perform video processing and analysis to:
      determine a crowd parameter and a rate of change of the crowd parameter indicative of crowd divergence;
      obtain a threshold based on a prior value of the crowd parameter associated with the physical space during a prior time period; and
      issue an alert in response to the rate of change in the crowd parameter indicative of crowd divergence exceeding the threshold.

2. The analytical recognition system according to claim 1, wherein the crowd parameter is a real-time crowd count.

3. The analytical recognition system according to claim 1, wherein the crowd parameter is a real-time crowd density estimation.

4. The analytical recognition system according to claim 1, wherein the crowd parameter includes at least one of an arrival velocity or a departure velocity of individuals at the physical space.

5. The analytical recognition system according to claim 1, wherein the video analytics module is further configured to issue an alert of a potential flash mob or gang robbery.

6. The analytical recognition system according to claim 5, wherein the video analytics module is connected to an array of cameras organized in a network and wherein upon issuance of an alert each camera in the network is utilized to track one or more objects or individuals.

7. The analytical recognition system according to claim 1, wherein the video analytics module alerts security of a potentially hazardous situation or criminal activity.

8. The analytical recognition system according to claim 7, wherein the video analytics module is connected to an array of cameras organized in a network and wherein upon issuance of an alert each camera in the network is utilized to track one or more objects or individuals.

9. The analytical recognition system according to claim 1, video analytics module is further configured to determine a vector indicating a facial direction of one or more individuals.

10. The analytical recognition system according to claim 9, video analytics module is further configured to determine if the vector is facing in a same direction for a time period exceeding a preset period.

11. The analytical recognition system according to claim 10, video analytics module is further configured to generate an investigation in response to the vector facing in the same direction for the time period exceeding a preset period.

12. A method for analytical video processing, the method comprising:
   capturing a video sequence of a physical space through at least one video camera;
   determining a crowd parameter and a rate of change of the crowd parameter indicative of crowd divergence;
   obtaining a threshold based on a prior value of the crowd parameter associated with the physical space during a prior time period; and
   issuing an alert in response to the rate of change in the crowd parameter indicative of crowd divergence exceeding the threshold.

13. The method according to claim 12, wherein the crowd parameter is a real-time crowd count.

14. The method according to claim 12, wherein the crowd parameter is a real-time crowd density estimation.

15. The method according to claim 12, wherein the crowd parameter includes at least one of an arrival velocity or a departure velocity of individuals at the physical space.

16. The method according to claim 12, further comprising:
   determining a vector indicating a facial direction of one or more individuals.

17. The method according to claim 16, further comprising:
   determining if the vector is facing in a same direction for a time period exceeding a preset period.

18. The method according to claim 17, further comprising:
   generating an investigation in response to the vector facing in the same direction for the time period exceeding a preset period.

* * * * *